United States Patent [19]

Yoshimura et al.

[11] Patent Number: 4,647,751

[45] Date of Patent: Mar. 3, 1987

[54] SECONDARY CONDUCTOR SUPERVISING DEVICE OF RESISTANCE WELDER CONTROL SYSTEM

[75] Inventors: Katsuo Yoshimura; Masato Furudate, both of Kanagawa, Japan

[73] Assignee: Dengensha Manufacturing Company Limited, Kanagawa, Japan

[21] Appl. No.: 824,995

[22] Filed: Feb. 3, 1986

[30] Foreign Application Priority Data

Feb. 19, 1985 [JP] Japan .................................. 60-30899

[51] Int. Cl.⁴ ............................................ B23K 11/24
[52] U.S. Cl. .................................................. 219/109
[58] Field of Search ................................ 219/109, 110

[56] References Cited

U.S. PATENT DOCUMENTS 3,546,421 12/1970 Meyer et al. ......................... 219/110
4,577,086 3/1986 Needham et al. .................... 219/109

FOREIGN PATENT DOCUMENTS 54-37780 11/1979 Japan .
59-64180 4/1984 Japan .................................. 219/109
60-6751 2/1985 Japan .................................. 219/110

Primary Examiner—Clifford C. Shaw
Attorney, Agent, or Firm—Sughrue, Mion, Zinn, Macpeak & Seas

[57] ABSTRACT

A secondary conductor supervising device of a resistance welder control system for supervising short-circuit, disconnection, and/or deterioration of a secondary conductor by means of a current flowing through a resistance welder, which comprises a voltage detecting circuit for detecting a voltage from the secondary conductor, inclusive of a secondary cable, of the resistance welder, a current detecting circuit for detecting a current flowing through the resistance welder, a divider for dividing the output of the voltage detecting circuit by the output of the current detecting circuit, an average computer for averaging the output of the divider over a part or the whole of a welding period, a supervisory level setting unit for setting a resistance value such as of the secondary conductor, and a comparator for comparing the output of the setting unit with the output of the average computer based on the welding period. A warning output is generated preferably when the number of times at which the comparator provides an output reaches a value preset in a counter.

4 Claims, 1 Drawing Figure

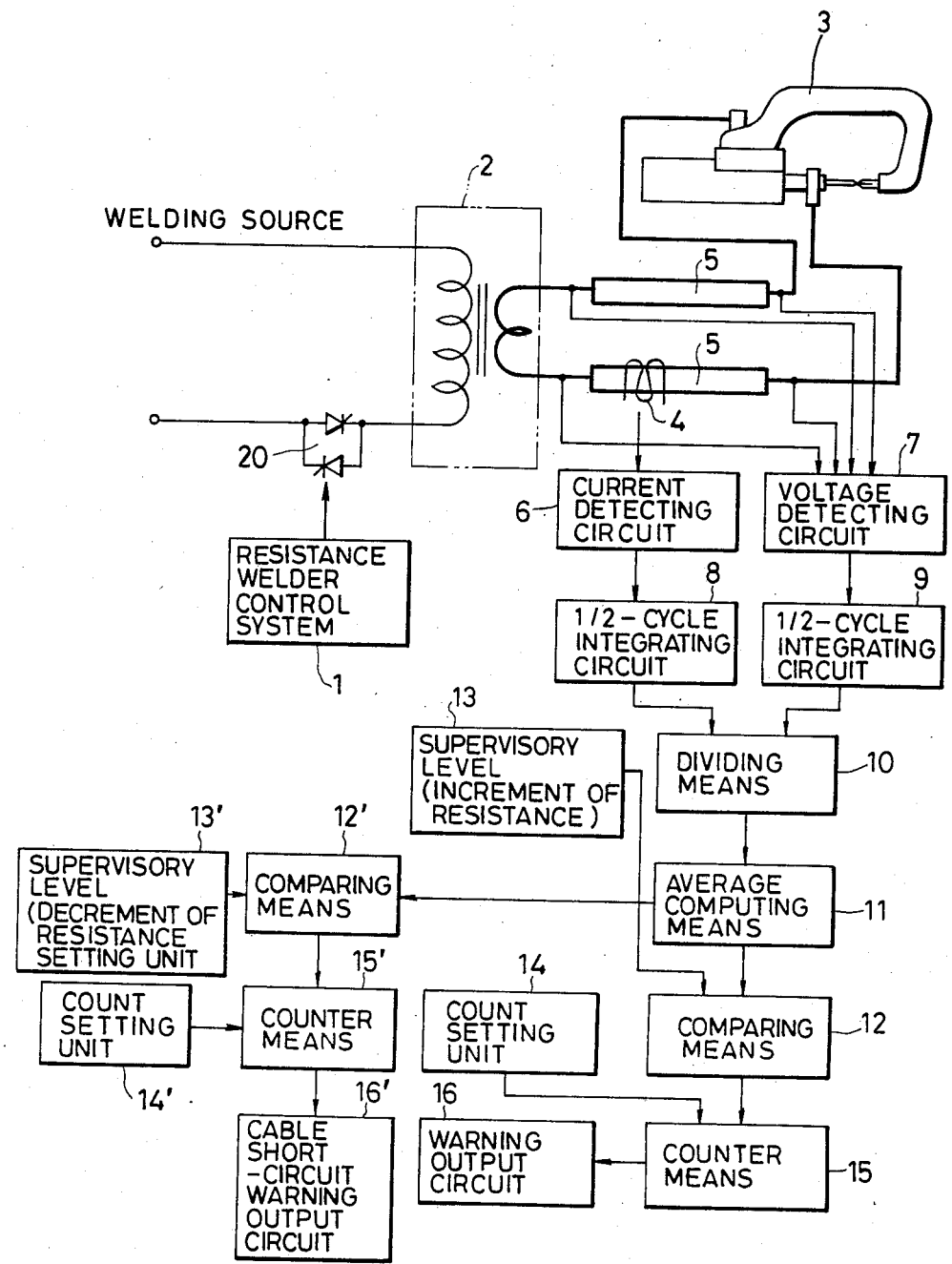

SECONDARY CONDUCTOR SUPERVISING DEVICE OF RESISTANCE WELDER CONTROL SYSTEM

BACKGROUND OF THE INVENTION

1. Field of the Invention

This invention relates to a secondary conductor supervising device of a resistance welder control system for supervising short-circuit, disconnection, and/or deterioration of a secondary conductor, inclusive of a secondary cable, of a resistance welder by means of a current flowing through the resistance welder.

2. Description of the Prior Art

The secondary conductor or secondary cable of the spot welder is subjected to expansion and bending frequently at high speed because of its property of welding work.

Recently, the case of performing such work by robots is increasing and cable wear is becoming more and more severe. To examine the extent of wear of the cable, in the prior art, a small current is caused to flow into the secondary cable by the use of a separate power source, resultant electrical values are measured by a voltmeter and an ammeter, and an increased amount of calculated resistance is inquired to determine the time of exchange of the secondary cable.

The foregoing work, however, is very laborious because some hundred secondary cables must be checked by man power. To automate such work, Japanese Utility Model Publication No. 54-37780 proposed "Secondary conductor supervising device of resistance welder". According to this proposed device, the rate of increase of impedance of the secondary cable in use as compared with that of a new secondary cable is monitored automatically, and warning is provided when the monitored rate of increase exceeds a preset level.

The conventional device of the above type operates in such a manner that it supervises deterioration of the secondary cable by means of a variation of impedance of the secondary cable. Therefore, in case the secondary cable pair has the configuration wherein its two wires are insulated from each other and stranded spirally and tightly together, like the so-called kickless type cable, the conventional device produces a comparatively minor problem. However, in case the secondary cable pair consists of two independent wires, these wires separate from each other due to a repulsive force generated upon being powered to change its impedance; thus the conventional device tends to provide warning notifying of deterioration of the cable even when the secondary cable is not disconnected nor deteriorated really. Further, the conventional device has the problem that it provides warning instantly when an accidental electrical signal caused by noise, for example, comes into its detection circuit.

SUMMARY OF THE INVENTION

The present invention has been devised to solve the foregoing problems. In brief, a secondary conductor supervising device of a resistance welder control system according to the present invention comprises a voltage detecting circuit for detecting a voltage from a secondary conductor, inclusive of a secondary cable, or a resistance welder, a current detecting circuit for detecting a current flowing through the resistance welder, a dividing means for dividing the output of the voltage detecting circuit by the output of the current detecting circuit, an average computing means for averaging the output of the dividing means over a part or the whole of a welding period, a supervisory level setting unit for setting a resistance value such as of the secondary conductor, and a comparing means for comparing the output of the setting unit with the output of the average computing means based on the welding period, whereby shortcircuit, disconnection, and/or deterioration of the secondary conductor is supervised by means of the current flowing through the resistance welder.

In the foregoing configuration, computation of a resistance value of the secondary cable is carried out by a microcomputer (hereinafter referred to as micon) which is included in the welder control system on the basis of a voltage and current value of the secondary cable caused by powering the resistance welder, so that one control system has both the welding current control function and the monitor function of detecting disconnection/deterioration of the secondary conductor, thereby reducing a total cost. Further, the reliability of monitoring the cable is improved by the use of the double check feature, that is, the judgement about providing warning is performed by obtaining the average of resistance values over an interval not exceeding the welding period and the final warning output is provided if the number of times at which the average comes outside a preset range reaches a preset count not exceeding a preset number of times of welding. Furthermore, troubles, such as short-circuit occurring inside the sdecondary cable, arising if the cable is heavily turned or subjected forcedly to repetition of bending action by a robot, for example, can be detected by obtaining the resistance value of the cable on the basis of a voltage between the ends of the secondary cable pair and a primary or secondary current of the resistance welder, similarly to the case of detecting deterioration of the cable, and if the obtained value is smaller than a preset value it is treated as short-circuit of the cable and warning is provided.

BRIEF DESCRIPTION OF THE DRAWING

The sole drawing is an electrical block diagram showing an embodiment of a device for supervising short-circuit, disconnection, and/or deterioration of a secondary conductor of a resistance welder according to the present invention.

DESCRIPTION OF THE PREFERRED EMBODIMENT

An embodiment of a supervising device according to the present invention will now be described with reference to the circuit block diagram.

In the sole drawing, an exemplary resistance welder is configured so that a resistance welder control system 1 is connected to a thyristor 20 interposed between a welding source and a welding transformer 2, and to the secondary side of the welding transformer a spot welding gun 3 is connected through a pair of positive/negative secondary cables 5, 5.

Describing first a warning circuit configuration against disconnection/deterioration of the secondary cable, a voltage generated between the ends of the secondary cable pair upon powering of the resistance welder is applied to a voltage detecting circuit 7 and full-wave-rectified therein, and then is integrated for a half ($\frac{1}{2}$) period of the source frequency by a $\frac{1}{2}$-cycle integrating circuit 9 of the subsequent stage. On the other hand, a primary or secondary current flowing through the welder is detected by a current detector 4. The output of this current detector 4 is full-wave-rectified by a current detecting circuit 6 and then integrated for a half ($\frac{1}{2}$) cycle by a $\frac{1}{2}$-cycle integrating circuit 8 of the subsequent stage. The two outputs of the foregoing $\frac{1}{2}$-cycle integrating circuits are applied to a dividing means 10 to obtain the resistance of the secondary cable. The obtained resistance value is applied to an average computing means 11, which computes the sum of resistance over a predetermined part (an interval corresponding to intermediate six cycles of a whole welding time of ten cycles, for example) of the whole welding time or over the whole welding period and divides the sum of resistance by the interval contributing to summing to provide the average of resistance standing during the welding period. The output of this computing means 11 is applied to a comparing means 12. This comparing means 12 compares a value (a setting value) given from a supervisory level (increment of resistance) setting unit 13 with the output of the computing means 11. When the computed average is larger than the setting value the comparing means provides an output and applies it to a counter means 15. This counter means 15 is designed so that it provides an output only when the number of times of signal incoming reaches a count preset in a count setting unit 14 which count does not exceed a preset number of times of welding. The output of the counter means is applied to a warning output circuit 16 to provide warning notifying of disconnection/deterioration of the secondary cable. In the foregoing configuration, this counter means is included if the reliability of warning is strongly desired.

A warning circuit configuration against short-circuit of the secondary cable will then be described.

A secondary cable short-circuit warning output circuit 16' is formed by the same circuit means as that for disconnection/deterioration of the cable. The setting value given to a comparing means 12' is set to a value lower than the normal resistance value of the secondary cable, and warning notifying of short-circuit of the secondary cable is provided when the detected resistance value becomes smaller than the setting value.

Therefore, these secondary cable short-circuit warning output circuit 16', comparing means 12', supervisory level (decrement of resistance) setting unit 13', count setting unit 14', and counter means 15' have the same configuration and function as those of the corresponding blocks 12 through 16.

Although the current used in the current detecting circuit 6 is generally the welding current, in case the control ability of the micon is insufficient and it is unable to control the welding current and supervise the secondary cable concurrently, another current used to monitor deterioration of the cable may be caused to flow independently when no welding takes place.

Accordingly, the term "a current flowing through the resistance welder" stipulated in the appended claims should not be limited to the welding current.

As is apparent from the foregoing description, according to the present invention, the drawback of the comparison technique regarding the impedance value of the secondary cable which was used to make the system low-cost in the prior art can be overcome by utilizing the micon of the resistance welder control system, and the accurate comparison technique concerning the resistance value of the secondary cable can be employed which is realized at a low cost and provides a high degree of supervisory precision. The present supervisory device can detect also the trouble of short-circuit arising inside a cable such as the kickless cable, and provide warning about deterioration/disconnection of the secondary cable and internal short-circuit of the same.

What is claimed is:

1. A secondary conductor supervising device of a control system for a resistance welder comprising:
    a voltage detecting circuit for detecting a voltage from a secondary conductor of said resistance welder,
    a current detecting circuit for detecting a current flowing through the resistance welder,
    a dividing means for dividing the output of said voltage detecting circuit by the output of said current detecting circuit,
    an average computing means for averaging the output of said dividing means over at least a part of a welding period,
    a first supervisory level setting unit for setting a first resistance value,
    a first comparing means for comparing the output of said first setting unit with the output of said average computing means in accordance with the welding period, and
    first warning means for providing a warning output in accordance with a change in resistance of the secondary conductor,
    whereby at least one of a short-circuit, disconnection, and deterioioration of the secondary conductor are detected in accordance with the current flowing through the resistance welder.

2. A secondary conductor supervising device of a resistance welder control system according to claim 1, further comprising counter means for storing a preset value, wherein a warning output is generated when the number of times at which said comparing means provides an output reaches said preset value.

3. A secondary conductor supervising device of a resistance welder control system according to claim 1, further comprising:
    a second supervisory level setting unit for setting a second reference value,
    a second comparing means for comparing the output of said second setting unit with the output of said average computing means in accordance with the welding period, and
    second warning means for providing a warning output in accordance with a change in resistance of the secondary conductor,
    said second setting unit, said second comparing means, and said second warning means detecting a short-circuit in said secondary conductor in accordance with the current flowing through the resistance welder.

4. A secondary conductor supervising device of a resistance welder control system according to claim 3, wherein said first setting unit, said first comparing means, and said first warning means detect at least one of disconnection and deterioration in said secondary conductor in accordance with the current flowing through the resistance welder.

* * * * *